US007770588B2

(12) United States Patent
Harrell et al.

(10) Patent No.: US 7,770,588 B2
(45) Date of Patent: Aug. 10, 2010

(54) AUTOMATED MOTORCYCLE WASH

(75) Inventors: Stephen Mark Harrell, Zionsville, IN (US); Jeffrey Blanton, Linton, IN (US); Rick Blanton, Linton, IN (US); Chad Tearman, Franklin, IN (US); Brett Williams, Trafalgar, IN (US); Michael Perkins, Danville, IN (US); Gregory Vondrak, Orange Park, FL (US)

(73) Assignee: Harrell's Equipment & Supply Co., Inc., Indianapolis, IN (US)

(*) Notice: Subject to any disclaimer, the term of this patent is extended or adjusted under 35 U.S.C. 154(b) by 366 days.

(21) Appl. No.: 12/074,134

(22) Filed: Feb. 29, 2008

(65) Prior Publication Data

US 2009/0217955 A1  Sep. 3, 2009

(51) Int. Cl.
*B08B 3/02* (2006.01)
(52) U.S. Cl. .......................... 134/45; 134/123
(58) Field of Classification Search .................. 134/45, 134/123
See application file for complete search history.

(56) References Cited

U.S. PATENT DOCUMENTS

| | | | | |
|---|---|---|---|---|
| 2,699,792 | A | * | 1/1955 | Fisher ........................ 134/56 R |
| 4,269,049 | A | * | 5/1981 | Henderson ................... 70/227 |
| 4,269,141 | A | * | 5/1981 | Kennett ....................... 118/708 |
| 4,651,925 | A | * | 3/1987 | Harris ......................... 239/239 |
| 4,971,084 | A | * | 11/1990 | Smith et al. ................... 134/45 |
| 5,735,410 | A | * | 4/1998 | Kallstrom ..................... 211/20 |
| 5,883,816 | A | * | 3/1999 | Dollhopf et al. ............. 700/293 |
| 5,991,952 | A | * | 11/1999 | Bintzler et al. ............... 15/53.4 |
| 6,325,082 | B1 | | 12/2001 | Schlueter |
| 6,372,053 | B1 | * | 4/2002 | Belanger et al. .............. 134/34 |
| 6,425,407 | B2 | * | 7/2002 | Jones et al. ................ 134/57 R |
| 2007/0209681 | A1 | * | 9/2007 | Wade .......................... 134/10 |

FOREIGN PATENT DOCUMENTS

| | | | |
|---|---|---|---|
| CH | 679 646 | * | 3/1992 |
| DE | 43 25 973 | * | 10/1994 |
| DE | 43 23 505 | * | 1/1995 |
| DE | 44 02 611 | * | 8/1995 |

(Continued)

OTHER PUBLICATIONS

European Patent Office 0 733 528 Sep. 1996.*

(Continued)

*Primary Examiner*—Frankie L Stinson
(74) *Attorney, Agent, or Firm*—Clifford W. Browning; Krieg DeVault LLP

(57) ABSTRACT

The automated motorcycle wash of the present invention is designed to wash motorcycles ranging in length from 7 feet up to an 11 foot chopper. It will hold a motorcycle positioned within the wash bay securely in place while running a complete 2-step pre-soak cleaner application, a high pressure rinse, a low pressure clear coat protectant application, a spot free rinse, and a double dryer pass. The rear wheel cleaners of the present invention will wash the rear wheel and tires of a motorcycle positioned within the wash bay. The front wheel stop of the present invention will also wash the front wheel and tire of a motorcycle positioned within the wash bay with built in high pressure sprayers.

22 Claims, 12 Drawing Sheets

FOREIGN PATENT DOCUMENTS

| | | | |
|---|---|---|---|
| DE | 297 01 687 | * | 5/1997 |
| DE | 198 24 271 | * | 12/1999 |
| DE | 20212825 | * | 5/2003 |
| DE | 20307020 | * | 9/2003 |
| FR | 2 608 114 | * | 6/1988 |
| FR | 2 852 288 | * | 9/2004 |
| GB | 2 443 883 | * | 5/2008 |
| JP | 05-105040 | * | 4/1993 |
| JP | 08-253109 | * | 10/1996 |
| JP | 10-292661 | * | 11/1998 |
| JP | 2000-213195 | * | 8/2000 |
| JP | 2002-029394 | * | 1/2002 |

OTHER PUBLICATIONS

European Patent Office 0 947 405 Mar. 1999.*
WIPO WO 86/06693 Nov. 1986.*
WIPO WO 94/07713 Apr. 1994.*
WIPO 02/02454 Jan. 2002.*

* cited by examiner

AUTOMATED MOTORCYCLE WASH

BACKGROUND OF THE INVENTION

The present invention relates generally to automated vehicle washes, and more particularly to a novel automated motorcycle wash.

SUMMARY OF THE INVENTION

The automated motorcycle wash (10) of the present invention is designed to wash motorcycles ranging in length from 7 feet up to an 11 foot chopper. It will hold a motorcycle (24) positioned within a wash bay (28) securely in place while running a complete 2-step pre-soak cleaner application, a high pressure rinse, a low pressure clear coat protectant application, a spot free rinse, and a double dryer pass. The rear wheel and tire cleaners (32) of the present invention will wash the rear wheel (40) and tire (38) of a motorcycle (24) positioned within the wash bay (28). The front wheel stop (12) of the present invention will also wash the front wheel (44) and tire (18) of a motorcycle (24) positioned within the wash bay (28) with built in high pressure sprayers (25).

The automated motorcycle wash (10) of the present invention is designed to fit into an area approximately 26 feet long, 8 foot 6 inches wide and 10 feet tall. This will fit in most existing self-serve automobile wash bays, and it will fit easily into most motorcycle dealerships. The automated motorcycle wash (10) of the present invention is compatible with many of the existing automobile wash entry pay stations currently in use, including those that use a simple "Push To Start" button. In warm weather climate areas, the automated motorcycle wash (10) of the present invention could stand alone in any parking lot where proper utilities are provided. It could also be mounted on a trailer and become a mobile automated motorcycle wash that will be suitable for use at motorcycle rallies, trade shows, and the like.

One preferred embodiment of the automated motorcycle wash of the present invention to date comprises a wash bay sized to position a motorcycle therein, an overhead trolley assembly within the wash bay that is automatically moveable fore and aft over the full length of a motorcycle positioned within the wash bay, and having an offset spray arch for automatically applying cleaning and rinse solutions to the front, rear and sides of a motorcycle positioned within the wash bay, and a drying blower for automatically drying a wet motorcycle positioned within the wash bay; a wash bay floor, housing a motorcycle front wheel stop that automatically rises from the wash bay floor when an automated motorcycle wash sequence begins, having upper and lower V-wedge rollers to receive the front wheel of a motorcycle being positioned within the wash bay; and housing roller clamps that automatically rise from the wash bay floor and firmly grip between them the front wheel tire of a motorcycle being positioned within the wash bay after the front wheel tire first contacts the front wheel stop; and a rear V-wedge roller that automatically rises from the wash bay floor behind the front wheel of a motorcycle being positioned within the wash bay and makes contact with the front wheel tire after the front wheel tire first contacts the front wheel stop; and the wash bay floor also housing a side stand lock that automatically rises from the wash bay floor and makes locking contact with the extended side stand of a motorcycle being positioned within the wash bay; and the wash bay floor also housing rear wheel and tire cleaning and measuring units that automatically rise from the wash bay floor and position themselves on either side of the rear wheel of a motorcycle being positioned within the wash bay; and the wash bay floor also housing motorized conveyors under the front and rear wheels of a motorcycle positioned within the wash bay that automatically rotate the front and rear wheels of a motorcycle positioned within the wash bay when an automated motorcycle wash sequence begins.

Another preferred embodiment of the automated motorcycle wash of the present invention to date comprises a motorcycle front wheel stop docking device within a wash bay sized to position a motorcycle therein, and a wash bay floor housing the motorcycle front wheel stop, which automatically rises from the wash bay floor when an automated motorcycle wash sequence begins, the front wheel stop also having upper and lower V-wedge rollers to receive the front wheel tire of a motorcycle being positioned within the wash bay; and housing roller clamps that automatically rise from the wash bay floor and firmly grip between them the front wheel tire of a motorcycle being positioned within the wash bay after the front wheel tire first contacts the front wheel stop; and a rear V-wedge roller that automatically rises from the wash bay floor behind the front wheel of a motorcycle being positioned within the wash bay and makes contact with the front wheel tire after the front wheel tire first contacts the front wheel stop.

Another preferred embodiment of the automated motorcycle wash of the present invention to date comprises a motorcycle side stand lock within a wash bay sized to position a motorcycle therein, and a wash bay floor housing the side stand lock, which side stand lock automatically rises from the wash bay floor and makes locking contact with the extended side stand of a motorcycle being positioned within the wash bay.

Another preferred embodiment of the automated motorcycle wash of the present invention to date comprises a pair of motorcycle rear wheel and tire cleaner and length measurer units within a wash bay sized to position a motorcycle therein that has a motorcycle front wheel stop, and a wash bay floor housing the rear wheel and tire cleaning and measuring unit, which automatically rise from the wash bay floor and position themselves on either side of the rear wheel of a motorcycle being positioned within the wash bay.

Another preferred embodiment of the automated motorcycle wash of the present invention to date comprises an overhead trolley assembly within a wash bay sized to position a motorcycle therein that is automatically moveable fore and aft over the full length of a motorcycle positioned within the wash bay, and that has an offset spray arch for automatically applying cleaning and rinse solutions to the front, rear and sides of a motorcycle positioned within the wash bay, and a drying blower for automatically drying a wet motorcycle positioned within the wash bay.

Related objects of the present invention will be evident from the descriptions that follow.

DETAILED DESCRIPTION OF THE INVENTION

Figure 1:
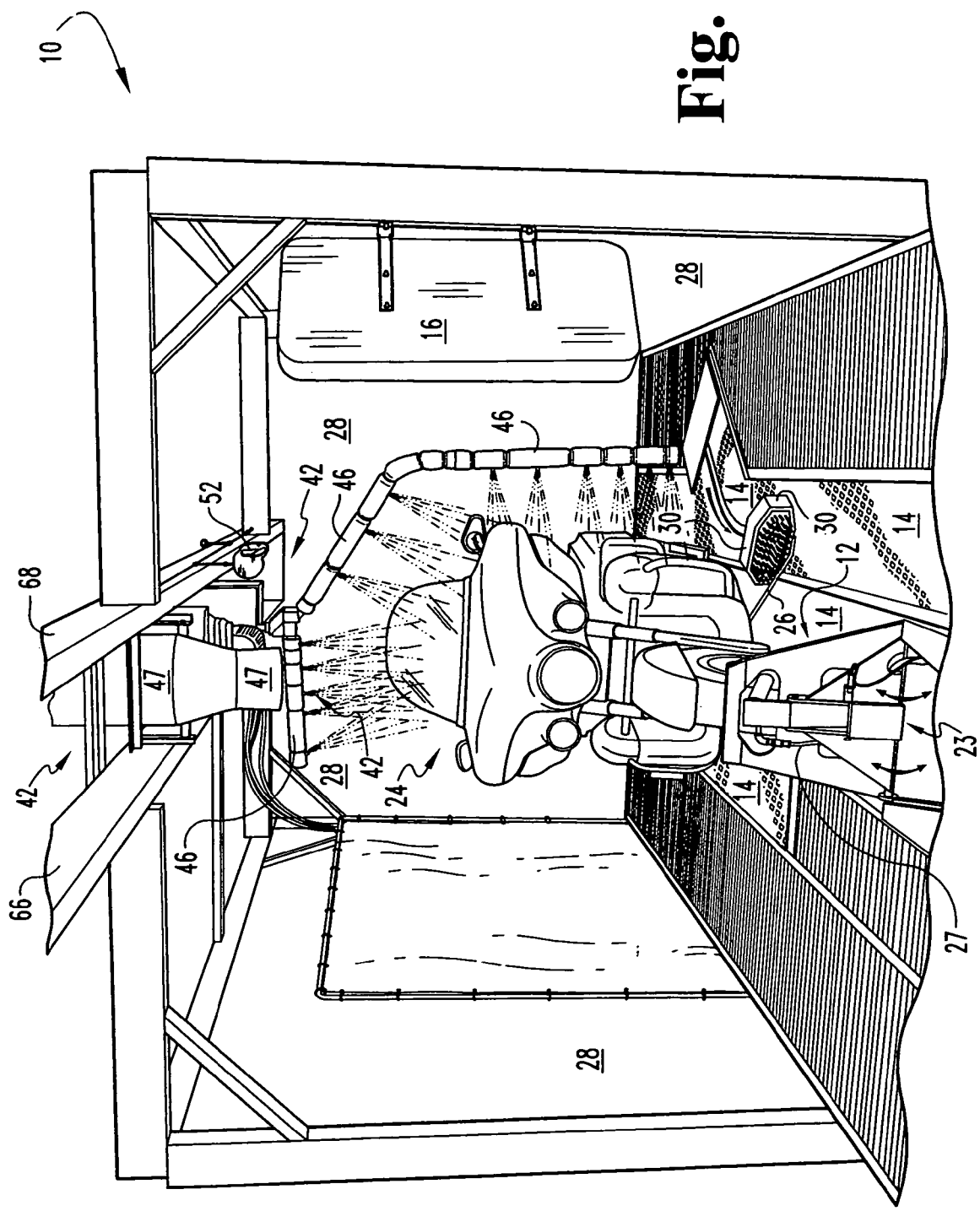
FIG. 1 is a perspective view of the automated motorcycle wash (10) of the present invention in a wash sequence.

For the purpose of promoting an understanding of the principles of the invention, reference will now be made to a preferred embodiment to date of the automated motorcycle wash (10) of the present invention that is illustrated in drawings. Referring now to FIGS. 1-12, the automated motorcycle wash (10) of the present invention will be first described by detailing the sequence of its automated wash operation.

A. The Sequence of Operation of the Automated Motorcycle Wash

1. First, a start switch at the entry of the wash bay (28) is depressed to power up the automated motorcycle wash (10) of the present invention.
2. An overhead trolley assembly (42) moves forward on parallel overhead rails (66, 68) of the wash bay (28) to a forward position that will permit a motorcycle (24) to be positioned within the wash bay (28).
3. When the overhead trolley assembly (42) moves to a forward position, a front wheel stop (12) docking device rises up from the wash bay floor (14), which has two sets of V-wedge rollers (21, 54), with the upper V-wedge rollers (56) having V-wedge jet (25) nozzles through which cleaning solutions are applied to the front wheel (44) and tire (18) of a motorcycle (24) positioned within the wash bay (28) (see FIG. 2).
4. Signage (16) within the wash bay (28) instructs the rider of a motorcycle (24) positioned within the wash bay (28) to approach the front wheel stop (12) to load the motorcycle (24) in the proper wash position within the wash bay (28).
5. When a motorcycle's front tire (18) hits the front wheel stop (12) a switch is activated that sends air-pressure-powered roller clamps (19, 20) up from below the wash bay floor (14) and into tire (18) from both sides, and an air-pressure-powered V-wedge roller assembly (22) rises from the wash bay floor (14) from behind to contact front tire (18) (see FIGS. 2 and 3).
6. A motorcycle (24) positioned within the wash bay (28) is now securely docked to the point that the signage (16) and audible commands instruct the motorcycle rider to dismount the motorcycle (24), to put the motorcycle's side stand (26) down, and to exit the wash bay (28).
7. The motorcycle rider now pushes a "To Start Wash" button located outside of the front entrance of the wash bay (28).
8. A side stand lock (30) now deploys from below the wash bay floor (14) behind the motorcycle (24) and moves forward until it is locked onto the motorcycle side stand (26) (see FIGS. 1 and 4).
9. The rear wheel and tire cleaners (32) and rear measuring units (34) now rise from the wash bay floor (14) from behind the motorcycle (24) and move forward until the measuring unit's photo eye's thru beam (36) is blocked by the rear tire (38) of the motorcycle (24) positioned within the wash bay (28) (see FIGS. 5 and 6). A pulse count taken during the movement of the measuring unit (34) from its stored position in the wash bay floor (14) to the back tire (38) of the motorcycle (24) is now recorded into the automated motorcycle wash's Programmable Logic Controller (PLC), which computes the distance from the front wheel stop (12) to the aft-most portion of rear tire (38) of the motorcycle (24), which will thereby determine the approximate length of a motorcycle positioned within the wash bay (28), which will then control the fore and aft movement of the overhead trolley assembly (42) over the motorcycle positioned within the wash bay (28).
10. A high pressure water pump starts and supplies the overhead trolley assembly (42) with high pressure cold water, and the overhead trolley assembly (42) moves aft from it forward position over the motorcycle (24) positioned within the wash bay (28) and a high pressure cold water spray is applied thereto from the offset spray arch (46) that cools down the motor and exhaust pipes of the motorcycle (24) positioned within the wash bay (28).
11. Once the overhead trolley assembly (42) has reached the PLC's computed rear position of the motorcycle (24) positioned within the wash bay (28), the high pressure water pump shuts down.
12. When a safety switch verifies that the side stand lock (30) is in its safe locking position against the motorcycle's side stand (26) (see FIG. 4), which firmly secures the motorcycle's side stand (26) in place, the air pressure holding the V-wedge rollers (22) in place against the front tire (18) of the motorcycle (24) positioned in the wash bay is released, and the front wheel (44) is thereby released to roll freely.
13. With both the front (44) and rear (40) wheels free to roll, front and rear conveyor belts (41, 43) thereunder that are flush with wash bay floor (14) are activated, and they rotate both wheels of the motorcycle (24) as a $1^{st}$ pass soap solution is applied to the front and rear tires (18, 38) and wheels (44, 40) through the V-wedge jet nozzles (25) and the nozzles (64) of rear wheel and tire cleaners (32) (see FIGS. 2, 3, 5 and 6).
14. At the same time a low pressure pump starts and supplies the overhead trolley assembly (42) with a 1st pass soap solution to apply through offset spray arch (46) to the motorcycle (24) positioned within the wash bay (28).
15. The overhead trolley assembly (42) now moves forward while the offset spray arch (46) applies a 1St pass soap solution on one side, from the rear to the front, of the motorcycle (24) positioned within the wash bay (28) (see, e.g., FIG. 1).
16. Once at the front, a spray arch index motor (90) within the overhead trolley assembly (42) rotates the offset spray arch (46) around the front of the motorcycle (24) positioned within the wash bay (28) with a continuous motion so that the offset spray arch (46) is moved to the other side of the motorcycle (24), thereby reversing the overhead trolley assembly (42).

17. The overhead trolley assembly (42) then moves the offset spray arch (46) back down the other side of the motorcycle (24) positioned within the wash bay (28) until the motorcycle's PLC-computed length is reached.

18. Once at the rear, the spray arch index motor (90) rotates the offset spray arch (46) around the rear of a motorcycle (24) positioned within wash bay (28), with a continuous motion so that the offset spray arch (46) is moved to the other side of the motorcycle(24), thereby reversing the overhead trolley assembly (42).

19. There is now an adjustable delay timer. During the delay, the 1st pass soap solution is switched to a 2nd pass soap solution, and the offset spray arch (46) is purged.

20. The overhead trolley assembly (42) then moves forward while the offset spray arch (46) applies the $2^{nd}$ pass soap solution as it moves along one side and to the front of the motorcycle (24) positioned within the wash bay (28).

21. Once at the front, the spray arch index motor (90) rotates the offset spray arch (46) around the front of a motorcycle (24) positioned within the wash bay (28) with a continuous motion so that the offset spray arch (46) is moved to the other side of the motorcycle (24), thereby reversing the overhead trolley assembly (42).

22. The overhead trolley assembly (42) now moves the offset spray arch (46) back down the other side of the motorcycle (24) positioned within wash bay (28) until the motorcycle's PLC-computed length is reached.

23. Once at the rear, the spray arch index motor (90) rotates the offset spray arch (46) around the rear of a motorcycle (24) positioned within the wash bay (28) with a continuous motion so that the offset spray arch (46) is moved to the other side of the motorcycle (24), thereby reversing the overhead trolley assembly (42).

24. The 2nd pass soap solution is now complete, and an adjustable dwell time will allow the soap solutions time to sit on the motorcycle (24) positioned within the wash bay (28) to soak into and break down soils, which will then allow the soils to be rinsed off the motorcycle (24) with high pressure water.

25. A high pressure pump is started for a high pressure rinse water pass.

26. The overhead trolley assembly (42) now moves forward to the front of the motorcycle (24) positioned within the wash bay (28) with the offset spray arch (46) angled in a forward spray angle of incidence of 285 degrees (see FIG. 12).

27. Once at the front, the spray arch index motor (90) rotates the offset spray arch (46) around the front of a motorcycle (24) positioned within the wash bay (28), to a forward spray angle of incidence of 75 degrees for the other side of the motorcycle (24)(see FIG. 9), with a continuous motion so that the offset spray arch (46) is moved to the other side of the motorcycle (24), thereby reversing the overhead trolley assembly (42) (see FIG. 9).

28. The overhead trolley assembly (42) now moves the offset spray arch (46) back down the other side of the motorcycle (24) positioned within the wash bay (28) until the motorcycle's PLC-computed length is reached.

29. Once at the rear, the spray arch index motor (90) rotates the offset spray arch (46) around the rear of a motorcycle (24) positioned within the wash bay (28) with a continuous motion so that the offset spray arch (46) is moved to the other side of the motorcycle (24), thereby reversing the overhead trolley assembly (42).

30. A high pressure pump continues to run for a second high pressure rinse water pass.

31. The overhead trolley assembly (42) now moves the offset spray arch (46) forward to the front of the motorcycle (24) positioned within the wash bay (28) with the offset spray arch (46) angled in a reverse spray angle of incidence of 255 degrees (see FIG. 11).

32. Once at the front, the spray arch index motor (90) rotates the offset spray arch (46) around the front of the motorcycle (24) positioned within the wash bay (28), to a reverse spray angle of incidence of 105 degrees (see FIG. 10), with a continuous motion so that the offset spray arch (46) is moved to the other side of the motorcycle (24), thereby reversing the overhead trolley assembly (42).

33. The overhead trolley assembly (42) now moves the offset spray arch (46) back down the other side of the motorcycle (24) positioned within the wash bay (28) until its PLC-computed length is reached.

34. Once at the rear, the spray arch index motor (90) rotates offset spray arch (46) around the rear of a motorcycle (24) positioned within the wash bay (28), with a continuous motion so that the offset spray arch (46) is moved to the other side of the motorcycle (24), thereby reversing the overhead trolley assembly (42).

35. Two high pressure rinse water applications are now complete, and the high pressure pump shuts off.

36. The low pressure pump starts and supplies the overhead trolley assembly (42) with a drying agent or clear coat protectant that is applied through the offset spray arch (46) to the motorcycle positioned within the wash bay (28).

37. The overhead trolley assembly (42) moves the offset spray arch (46) forward to the front of the motorcycle (24) positioned within the wash bay (28).

38. Once at the front, the spray arch index motor (90) rotates the offset spray arch (46) around the front of the motorcycle (24) positioned within the wash bay (28), with a continuous motion so that the offset spray arch (46) is moved to the other side of the motorcycle (24), thereby reversing the overhead trolley assembly (42).

39. The overhead trolley assembly (42) now moves the offset spray arch (46) back down the other side of the motorcycle (24) until its computed length is reached.

40. Once at the rear, the spray arch index motor (90) rotates the offset spray arch (46) around the rear of the motorcycle (24) positioned within the wash bay (28), with a continuous motion so that the offset spray arch (46) is moved to the other side of the motorcycle (24), thereby reversing the overhead trolley assembly (42).

41. The single pass drying agent or clear coat application is now complete.

42. A spot free pump is started for a two-pass spot free application of reverse-osmosis water.

43. The overhead trolley assembly (42) now moves the offset spray arch (46) forward to the front of the motorcycle (24) with a forward spray angle of incidence of 285 degrees (see FIG. 12).

44. Once at the front, the spray arch index motor (90) rotates the offset spray arch (46) around the motorcycle (24) positioned in the wash bay (28) to the other side of the motorcycle (24), to a forward spray angle of incidence of 75 degrees (see FIG. 9), with a continuous motion so that the offset spray arch (46) is moved to the other side of the motorcycle (24), thereby reversing the overhead trolley assembly (42).

45. The overhead trolley assembly (42) now moves the offset spray arch (46) back down the other side of the motorcycle (24) positioned within the wash bay until its PLC-computed length is reached.
46. Once at the rear, the spray arch index motor (90) rotates the offset spray arch (46) around the rear of the motorcycle (24), to a reverse spray angle of incidence of 255 degrees (see FIG. 11), with a continuous motion so that the offset spray arch (46) is moved to the other side of the motorcycle (24), thereby reversing the overhead trolley assembly (42).
47. The spot free pump continues to run for a second pass of spot free water.
48. The overhead trolley assembly (42) now moves the offset spray arch (46) forward to the front with the offset spray arch (46) to a reverse spray angle of incidence of 255 degrees (see FIG. 11).
49. Once at the front, the spray arch index motor (90) rotates the offset spray arch (46) around the front of the motorcycle (24) positioned in the wash bay (28), to a reverse spray angle of incidence of 105 degrees (see FIG. 10), with a continuous motion so that the offset spray arch (46) is moved to the other side of the motorcycle (24), thereby reversing the overhead trolley assembly (42).
50. The overhead trolley assembly (42) now moves the offset spray arch (46) back down the other side of the motorcycle (24) positioned within the wash bay 28 until its PLC-computed length is reached.
51. The two-pass spot-free applications are now complete.
52. The overhead trolley assembly (42) now moves back to its rear limit.
53. The rear wheel and tire cleaners (32) and the rear measure units (34) assemblies now retract back and into the wash bay floor (14), and the wheel conveyors (41, 43) stop rotating the wheels of the motorcycle (24) positioned within the wash bay (28).
54. A drying blower (47) in the overhead trolley assembly (42) starts, and an aerator valve in the offset spray arch (46) opens to purge water from the offset spray arch (46) to eliminate drainage from falling onto the motorcycle (24) positioned within the wash bay (28) during the drying cycle.
55. The overhead trolley assembly (42) now moves back over the motorcycle (24) positioned in wash bay (28) to the overhead trolley assembly's front limit.
56. The overhead trolley assembly (42) now moves back over the motorcycle (24) to the overhead trolley assembly's rear limit, completing the two-pass drier moves, and the drying blower (47) stops.
57. Increased air pressure is now applied to the V-wedge rollers (22) to again securely clamp and dock the front tire (18) and wheel (44) of the motorcycle (24) positioned within wash bay (28).
58. The side stand lock (30) is then retracted back and into the wash bay floor (14).
59. Signage and audible commands now instruct the rider of the motorcycle (24) positioned in the wash bay (28) to reenter the wash bay (28) and re-mount the motorcycle (24).
60. The rider is then instructed with audible commands to depress a foot pad on the wash bay floor (14) located on the rider's right side, and to simultaneously reach up above and to the rider's left, and with their left hand pull the release handle (52) until a buzzer sounds.
61. At the buzzer, the front wheel stop (12) retracts back into the wash bay floor (14), leaving the motorcycle (24) positioned within the wash bay (28) again under the full control of the rider, who then is instructed by signage (16) to exit the motorcycle (24) from the wash bay (28).
62. The rider the exits the wash bay (28) riding a clean motorcycle (24).

B. The Front Wheel Stop (12) Docking Device

Figure 2:
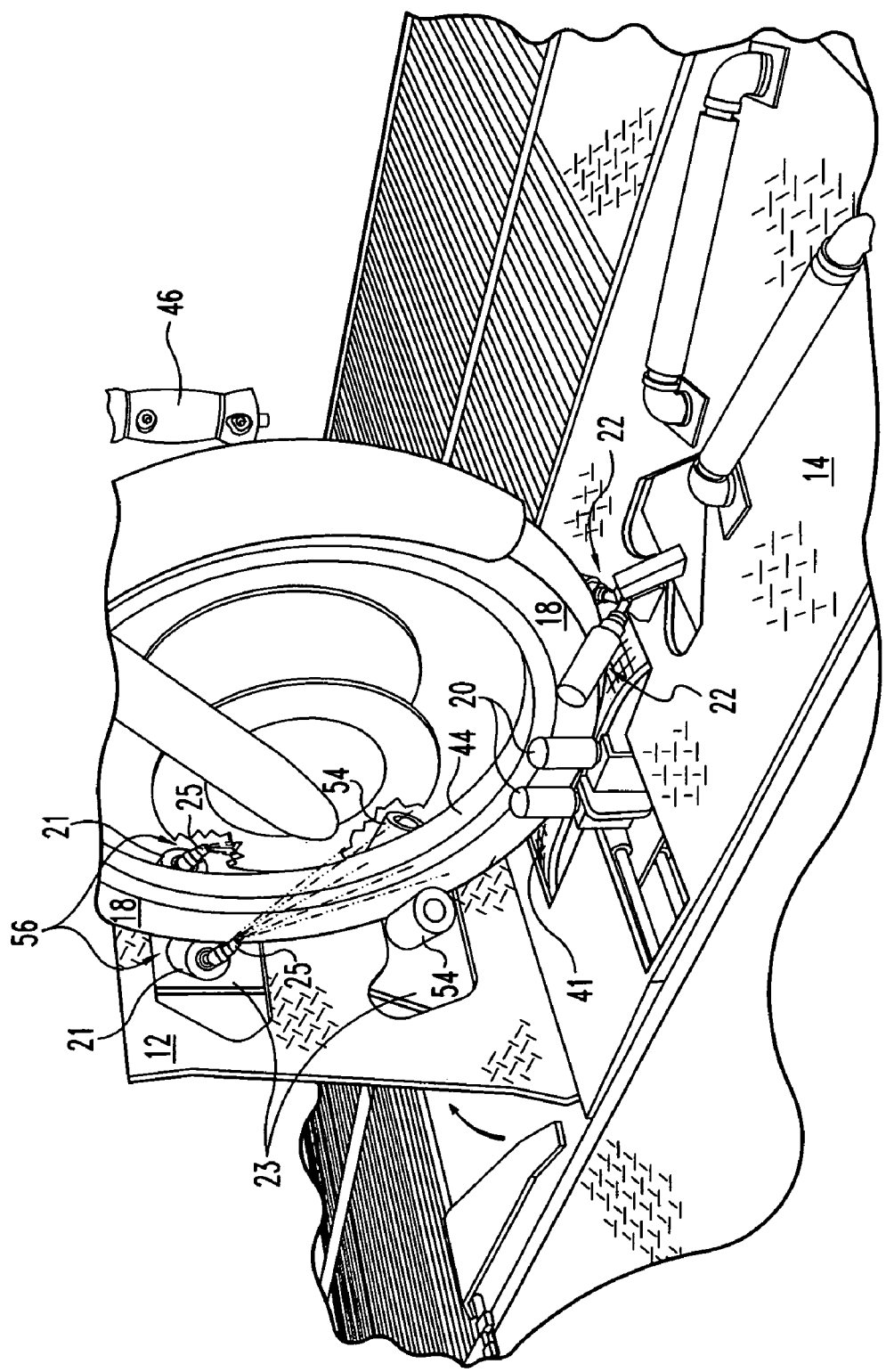
FIG. 2 is a segmented, close-up view of the front wheel stop docking device of the present invention with a motorcycle positioned within the wash bay.
Figure 3:
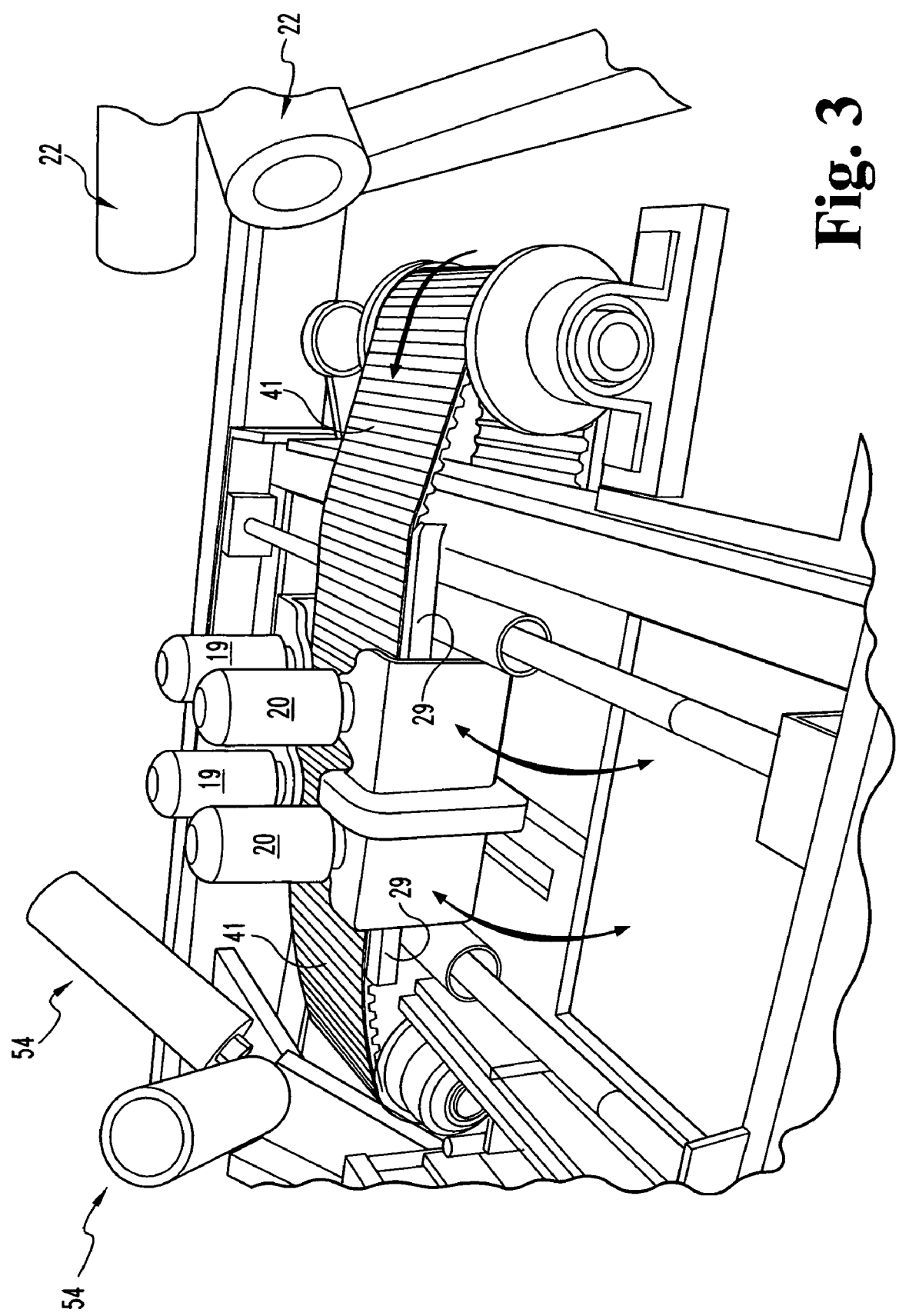
FIG. 3 is a segmented, close-up view of the front wheel stop docking device of the present invention without a motorcycle positioned within the wash bay, and with the wash bay floor removed therefrom.

Referring now to FIGS. 1-3, the front wheel stop (12) docking device deploys out of the wash bay floor (14) to a vertical position, activated by an air cylinder, and is locked into a stationary position with a locking mechanism. The locking mechanism is spring deployed and is released by an air cylinder. The front wheel stop (12) has two V-wedge rollers (54, 56) mounted on a rocker plate (23) that engage the front tire (18), above (56) and below (54) the center axis of the front wheel (44), of a motorcycle (24) positioned within wash bay (28). The upper rollers (21) turn on hollow shafts. The hollow shafts are connected to a high pressure line (27) (see FIG. 1) on one end, and 2 V-wedge jet nozzles (25) on the other end. High pressure wash and rinse solutions pass thru the hollow shafts and thru the V-wedge jet nozzles (25) and onto the front tire (18) and wheel (44) of a motorcycle (24) positioned within wash bay (28) for cleaning (see FIG. 2). There are two sets of side rollers (20, 19) on each side of the front tire (18) that cam up out of the wash bay floor (14) and squeeze the sides of the front tire (18) of a motorcycle (24) positioned within wash bay (28), activated by an air cylinder. A rear V-wedge roller assembly (22) deploys out of the wash bay floor (14), also activated by an air cylinder, and makes contact with the lower back part of the front tire (18) of a motorcycle positioned within wash bay (28). There is a pressure sensitive plate (29) underneath a front conveyor belt (41) (see FIG. 3) flush with the wash bay floor (14). When a motorcycle (24) being positioned within wash bay (28) pulls up onto the front conveyor belt (41) the pressure sensitive plate (58) activates a proximity switch that sends back an input signal to the PLC.

The PLC sends an output signal to an air cylinder that pushes up two side rollers (20, 19) and the rear V-wedge roller assembly (22). When the front conveyor belt (41) is started, the back V-wedge roller assembly (22) is released from engagement with the front tire (18) of a motorcycle (24) positioned within wash bay (28) by releasing air pressure, and the front conveyor belt (41) turns the front wheel (44) and front tire (18) in reverse. Turning the front tire (18) in reverse keeps the front tire (18) from wedging too tightly into the front V-wedge rollers (54, 56).

At the end of the wash sequence, the locking mechanism cylinder is deactivated, and it releases the lock on the front wheel stop (12). The front wheel stop (12) air cylinder is then released, thereby retracting the front wheel stop (12) back into the wash bay floor (14). The side roller (20, 19) air cylinder is released, thereby retracting the side rollers (20, 19) back into the wash bay floor (14). The air cylinder controlling the rear V-wedge roller assembly (22) is also released, which retracts the rear V-wedge roller assembly (22) back into the wash bay floor (14).

If air pressure or power is ever lost while the front wheel stop (12) docking device is to be engaged, the controlling air cylinders will not release the locking mechanism cylinder until after air pressure or power is restored, as a safety measure.

C. The Motorcycle Side Stand Lock (30)

Figure 4:
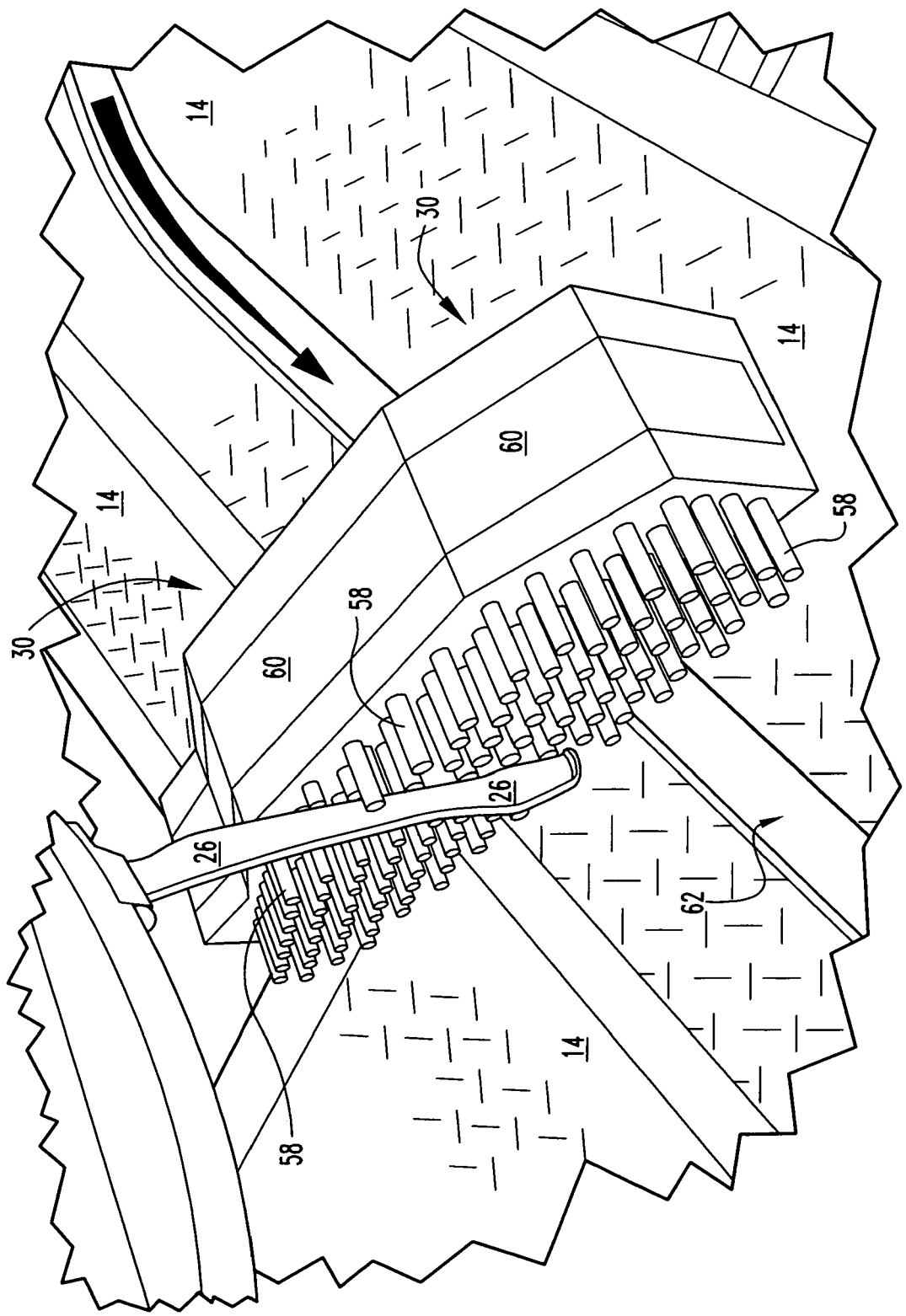
FIG. 4 is a segmented, close-up view of the side stand lock of the present invention with a motorcycle positioned within the wash bay.
Figure 5:
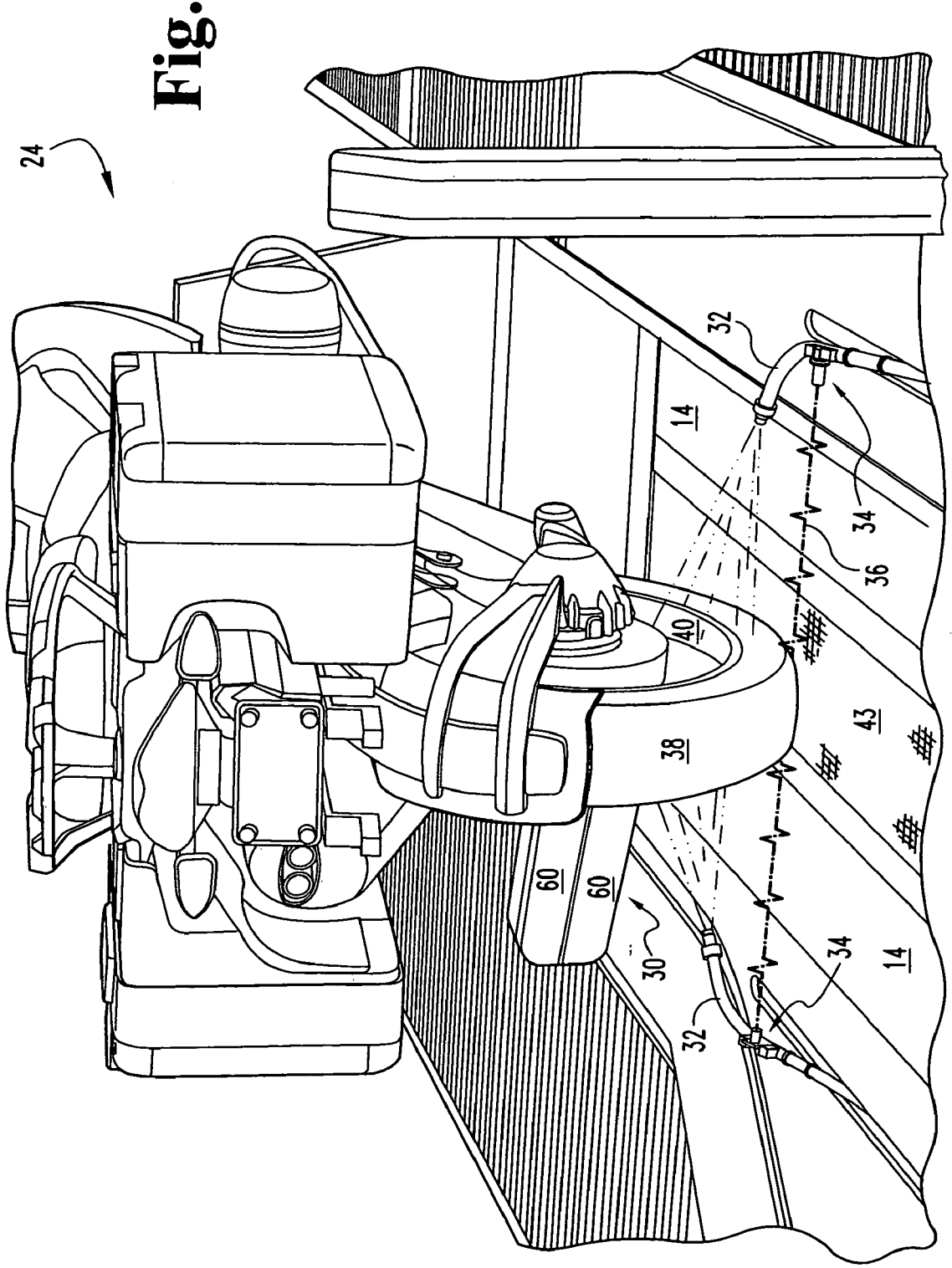
FIG. 5 is a segmented, close-up view of the rear wheel and tire cleaner and length measurer of the present invention with a motorcycle positioned within the wash bay.

Referring now to FIGS. 1, 4 and 5, the preferred motorcycle stand lock (30) to date is approx 5 inches tall and 20 inches wide. It has a multitude of stainless steel pins (58) that are spring loaded in the stand lock (30). When compressed, the pins (58) individually recess back into a plastic block (60) of the stand lock (30). The preferred block (60) to date has been a DELRON brand plastic block (60) that has a port in the side that is connected to channeling within the DELRON brand block (60) that goes from pin to pin. Water may be hooked to the port to flush any debris out of the pins (58) that would otherwise cause them to stick.

The side stand lock (30) assembly deploys from under the wash bay floor (14) by a magnetically coupled air cylinder. It runs along a rail assembly (62) that is under the wash bay floor (14). As side stand lock (30) comes forward, it will make contact with the deployed side stand (26) of a motorcycle (24) positioned within wash bay (28). The spring loaded pins (58) that make contact with the side stand (26) are depressed back into the DELRON block (60), leaving the remainder of the pins (58) forming around the side stand (26), which pins (58) effectively grip the side stand (26) firmly in place to stabilize the side stand (26) and thereby the motorcycle (24) being positioned within wash bay (28).

At the end of the wash cycle, the side stand lock (30) re-deploys back under the wash bay floor (14), and as side stand lock (30) retracts it pulls a slide plate back with it that covers the rail assembly (62) along which side stand lock (30) travels for the safety of the motorcycle rider when the rider re-enters the wash bay (28) at the end of the wash cycle.

D. The Rear Wheel and Tire Cleaner (32) and Length Measurer (34)

Figure 6:
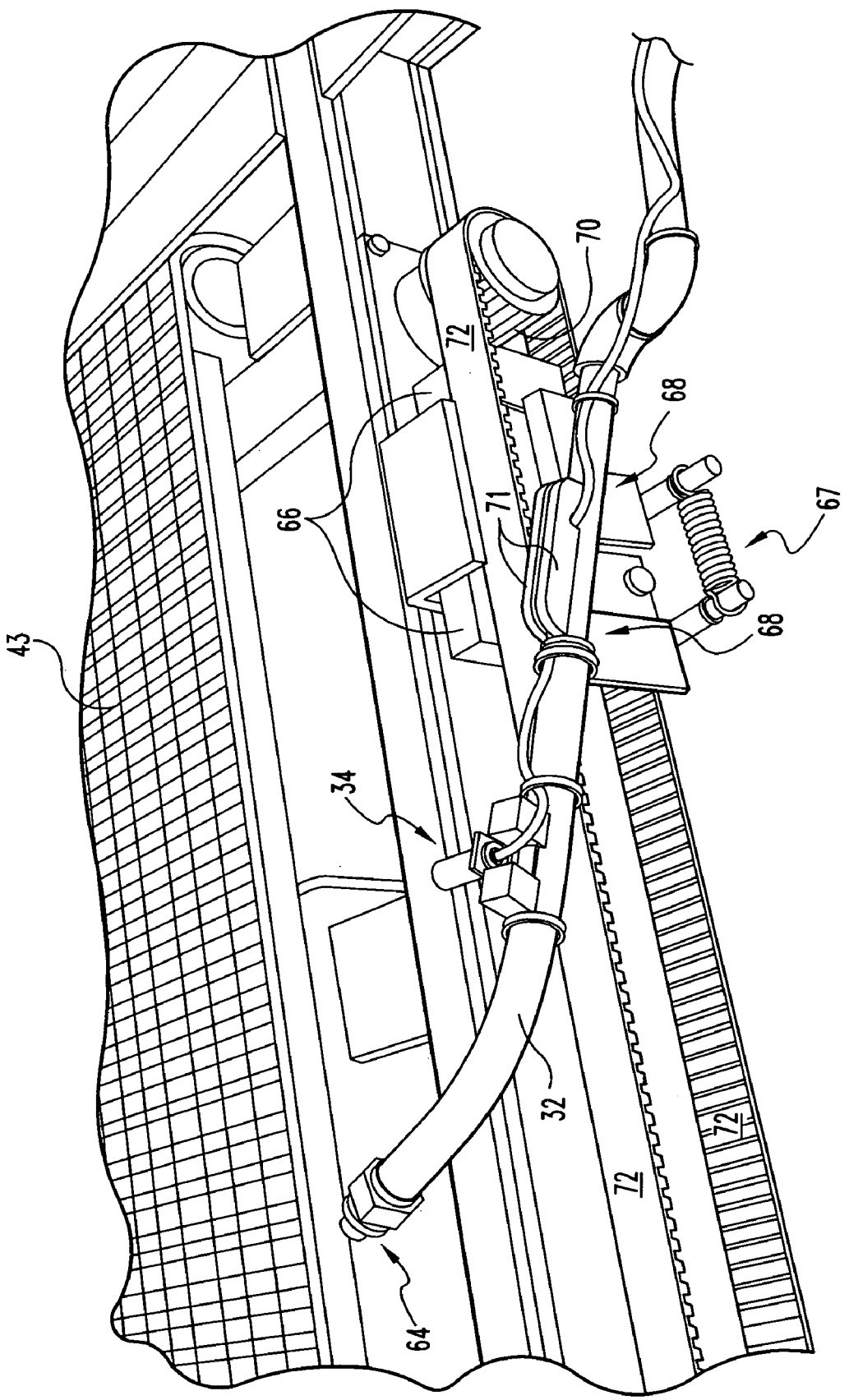
FIG. 6 is a segmented, close-up view of the left side rear wheel and tire cleaner and length measurer of FIG. 5, with the wash bay floor removed therefrom.

Referring now to FIGS. 5 and 6, the back wheel (40) and tire (38) of a motorcycle (24) being positioned within wash bay (28) are cleaned by rear wheel and tire cleaners (32), which are arms positioned on each side of the back wheel (40) and tire (38). To date, each arm has been made of ¾" stainless steel tubing with a V-wedge jet nozzle (64) at the end of each rear wheel and tire cleaner (32). The arms are mounted to a linear bearing block (66) with swivel mounts (68). The swivel mounts (68) allow the rear wheel and tire cleaners (32) to rotate and retract back under the wash bay floor (14) when not in use. The arms have a set of infrared thru beam rear measuring units (34) mounted on them for measuring the position of the back most portion of the back tire (38) of a motorcycle being positioned within the wash bay (28) to determine the overall length of the motorcycle (24).

The rear wheel and tire cleaners (32) run forward and backward by a 3-phase motor. As the motor runs them forward, the rear wheel and tire cleaners (32) deploy from under the wash bay floor (14) with a spring assist (67). Traveling approx 4" off the wash bay floor (14), the rear wheel and tire cleaners (32) move forward until the photo eye's (34) thru beam (36) finds the back of the rear tire (38) of a motorcycle (24) being positioned within the wash bay (28). The thru beam (36) is interrupted once it reaches the back most portion of the rear tire (38), which in turn positions the jet nozzle (64) on each rear wheel and tire cleaner (32) proximate the center of the rear wheel (40) for optimum cleaning.

The 3-phase motor turns a shaft with a toothed drive pulley (70) for each side. The toothed belt (72) has a linear block (66) mounted at each end of the belt (72). There is a limit switch at each end of the linear block (66) travel to stop the motor before the linear block (66) hits the end stops. To return to the rest position the rear wheel and tire cleaners (32) have cams (71) mounted on the top of them that make contact with polymer blocks. Once the cams hit the polymer blocks at the end of the travel, the spring assist (67) allows the rear wheel and tire cleaner (32) and length measurer (34) to retract back under the wash bay floor (14).

The slots in the floor (14) through which the rear wheel and tire cleaners (32) travel have spring loaded slide plates that keep the slots covered when they are retracted under the floor (14) for the safety of the motorcycle rider as the rider re-enters the wash bay (28) at the end of the wash cycle.

E. The Overhead Trolley Assembly (42)

Figure 7:
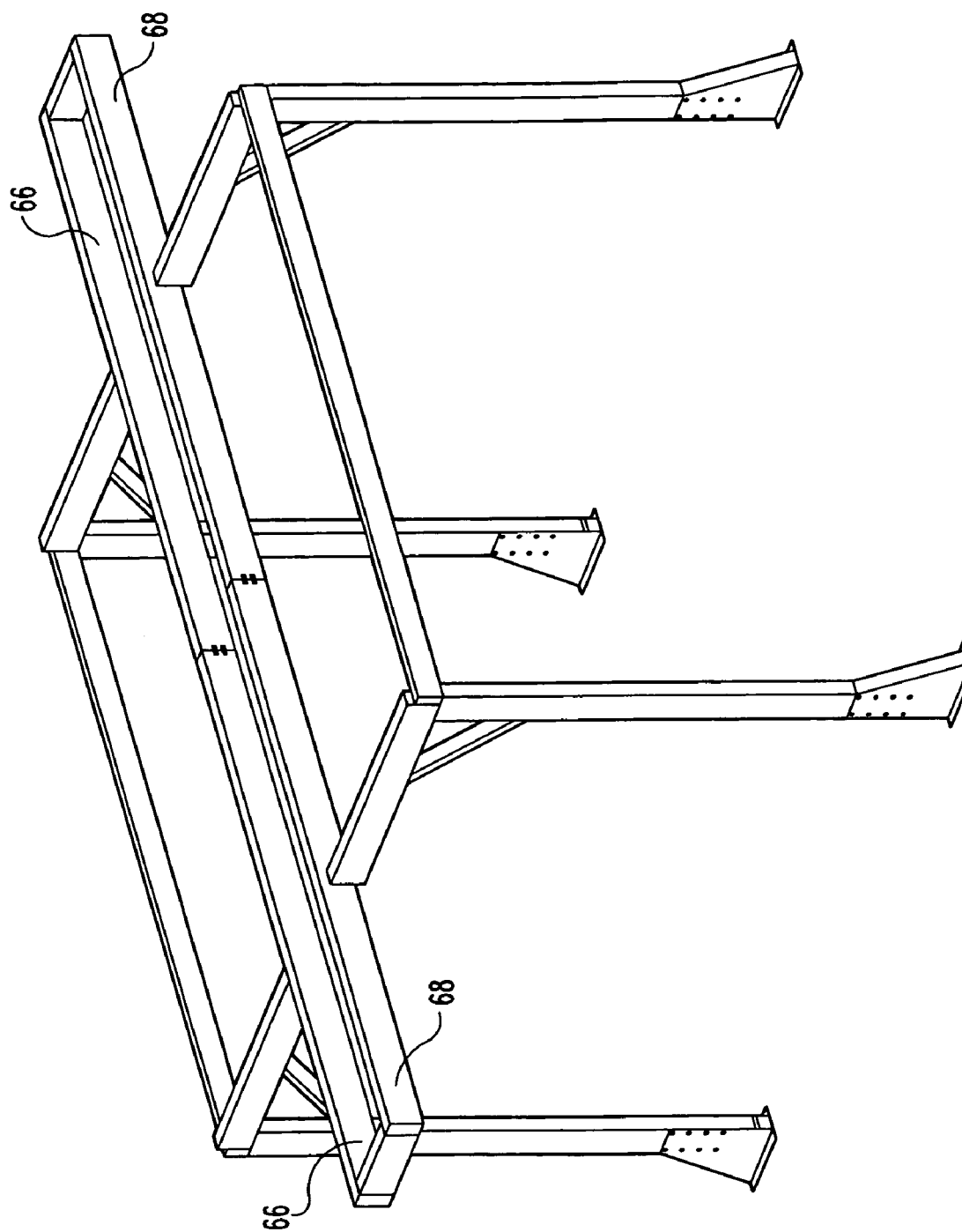
FIG. 7 is a perspective view of the superstructure of the wash bay of FIG. 1.
Figure 8:
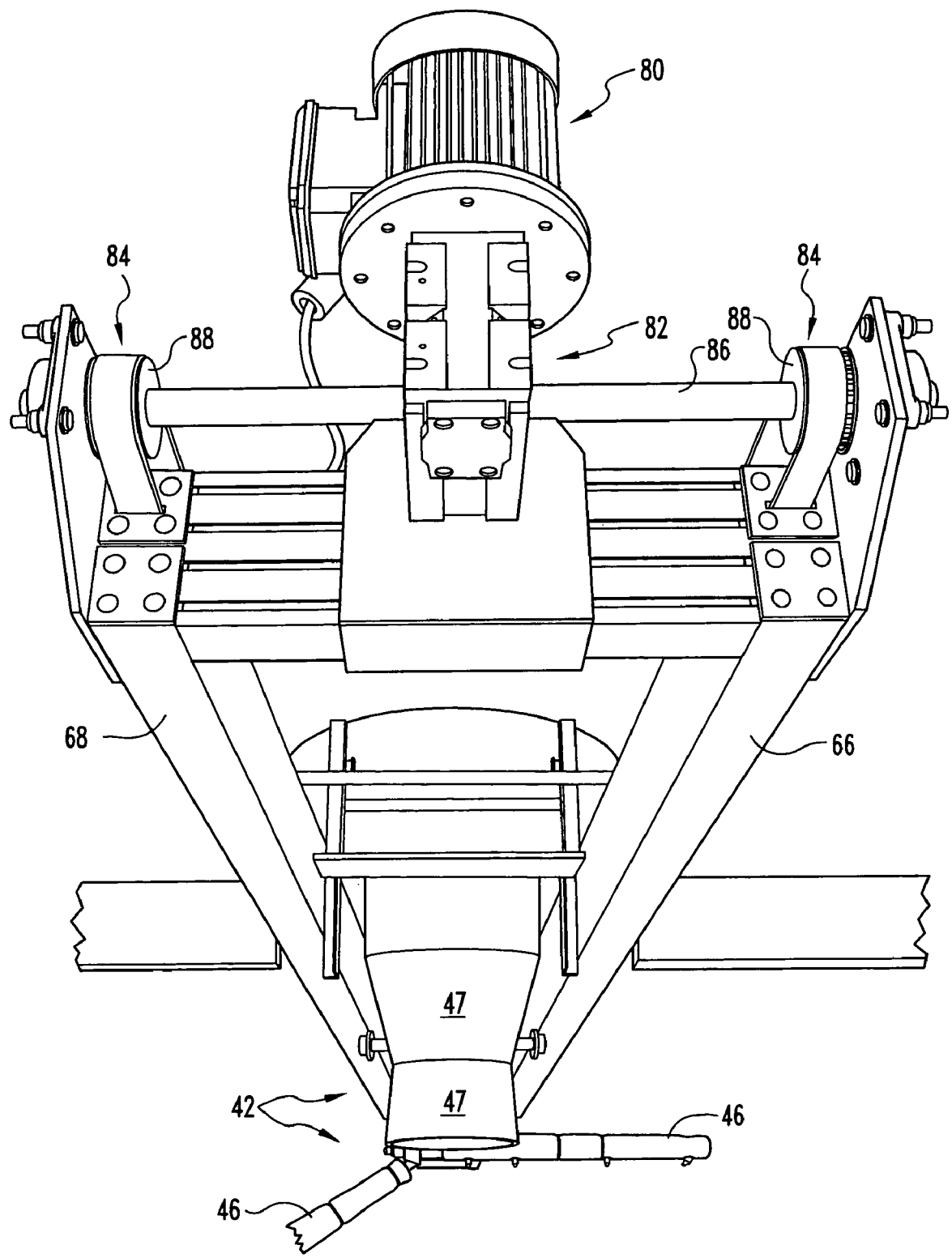
FIG. 8 is a segmented, perspective rear view of the fore and aft movement mechanism of the overhead trolley assembly of the present invention.
Figure 9:
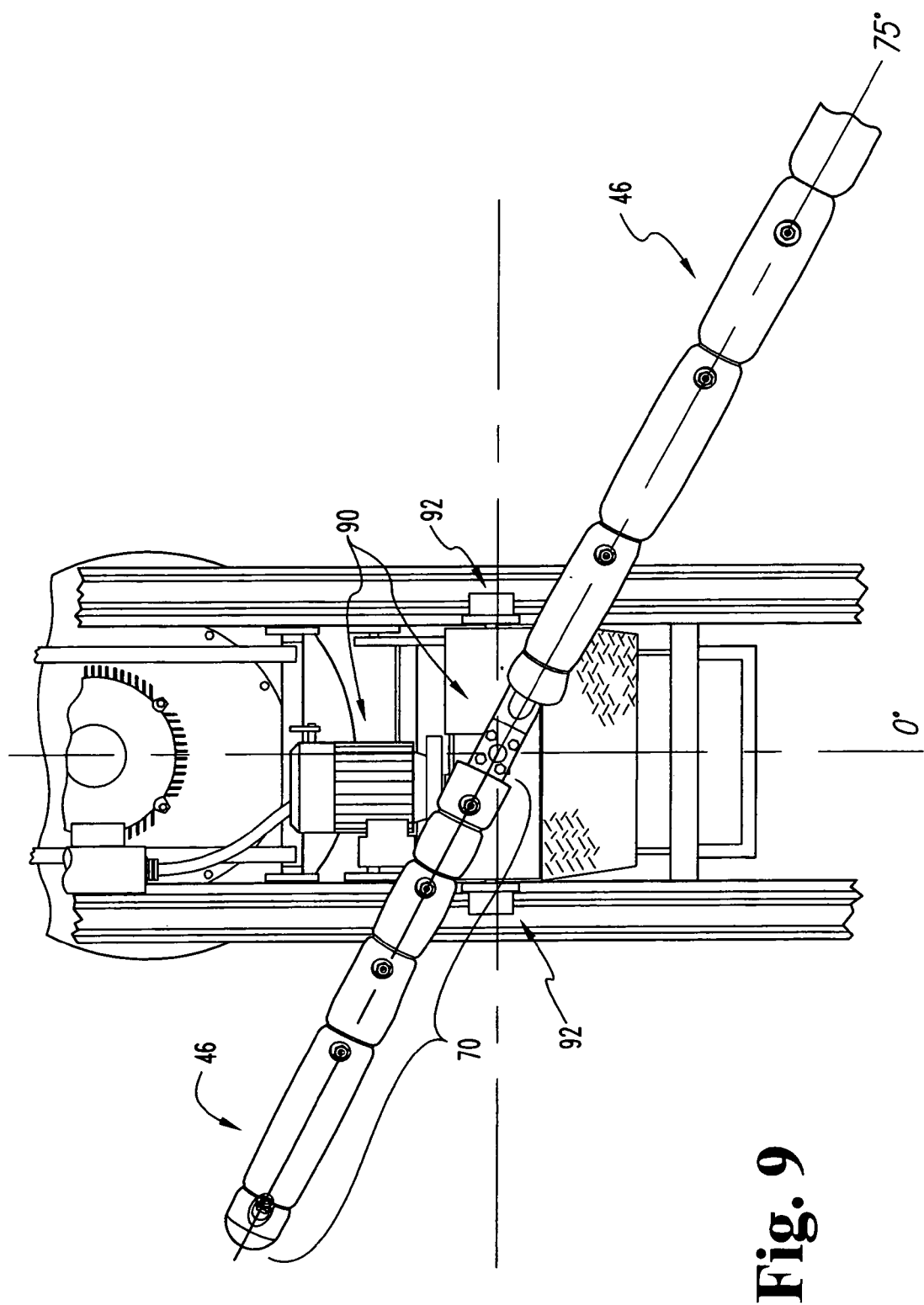
FIG. 9 is a segmented, overhead view of the overhead trolley assembly of the present invention with the offset spray arch of the present invention in a 75 degree angle of impingement to a motorcycle positioned within the wash bay.
Figure 10:
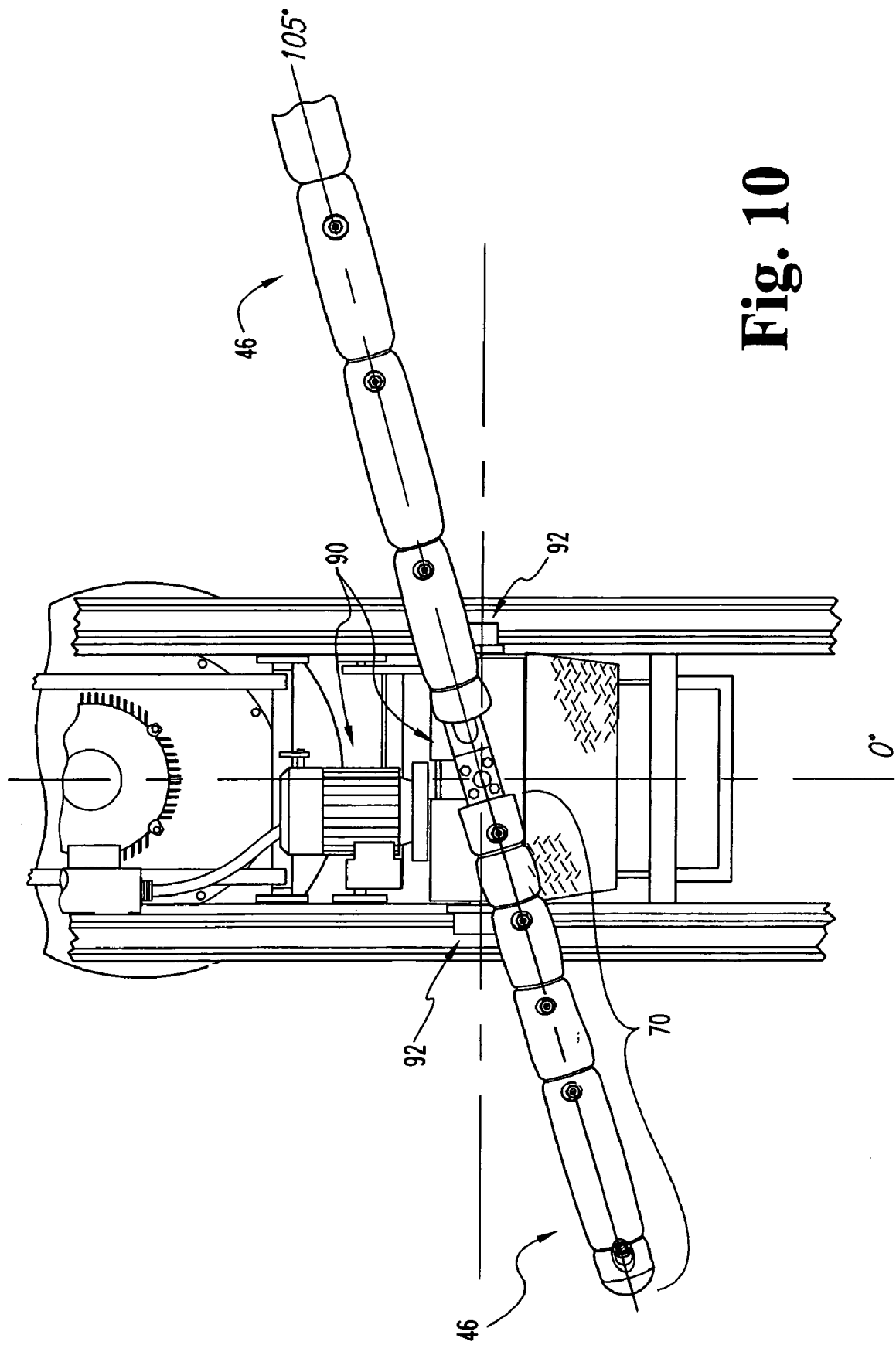
FIG. 10 is a segmented, overhead view of the overhead trolley assembly of the present invention with the offset spray arch of the present invention in a 105 degree angle of impingement to a motorcycle positioned within the wash bay.
Figure 11:
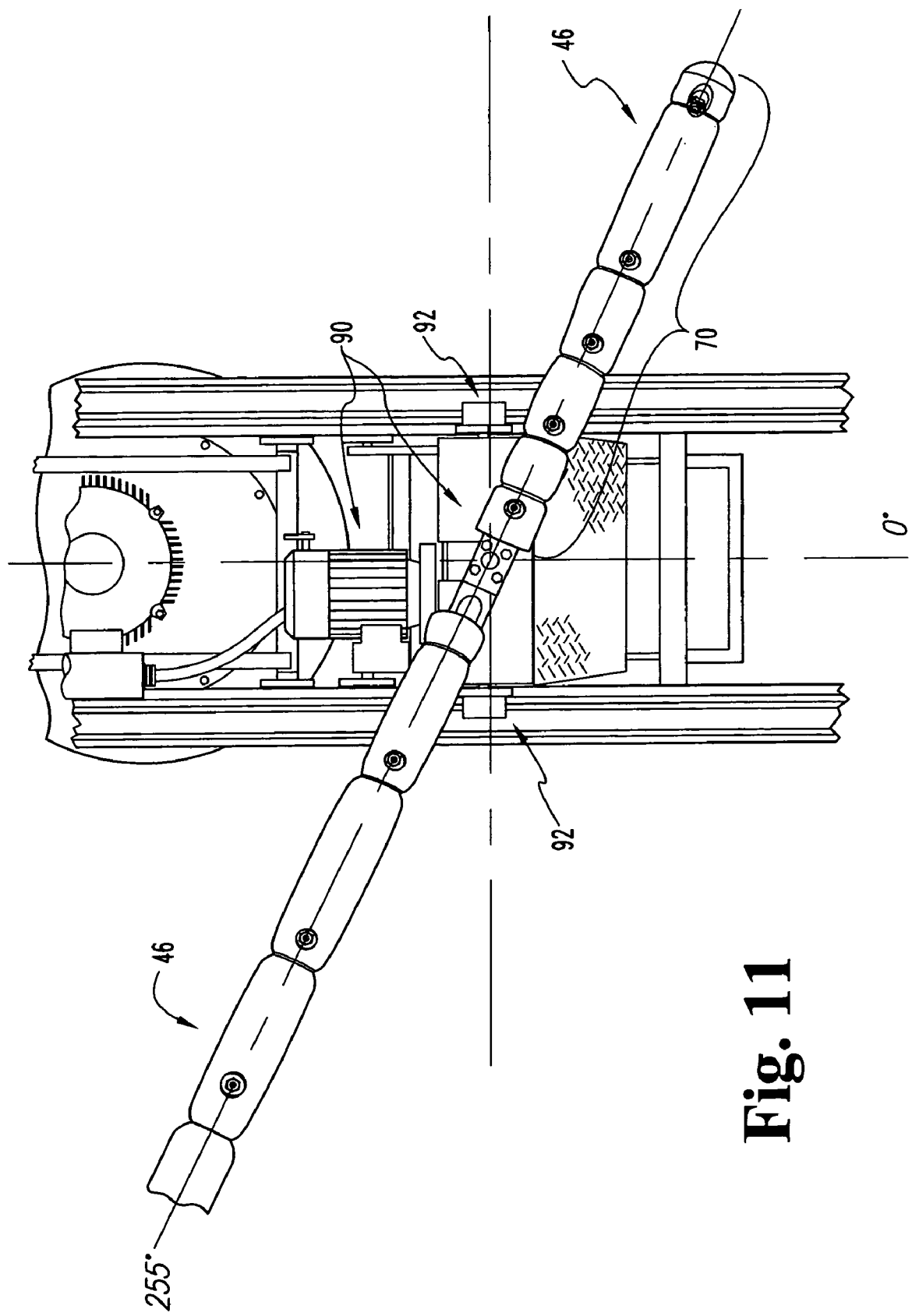
FIG. 11 is a segmented, overhead view of the overhead trolley assembly of the present invention with the offset spray arch of the present invention in a 255 degree angle of impingement to a motorcycle positioned within the wash bay.
Figure 12:
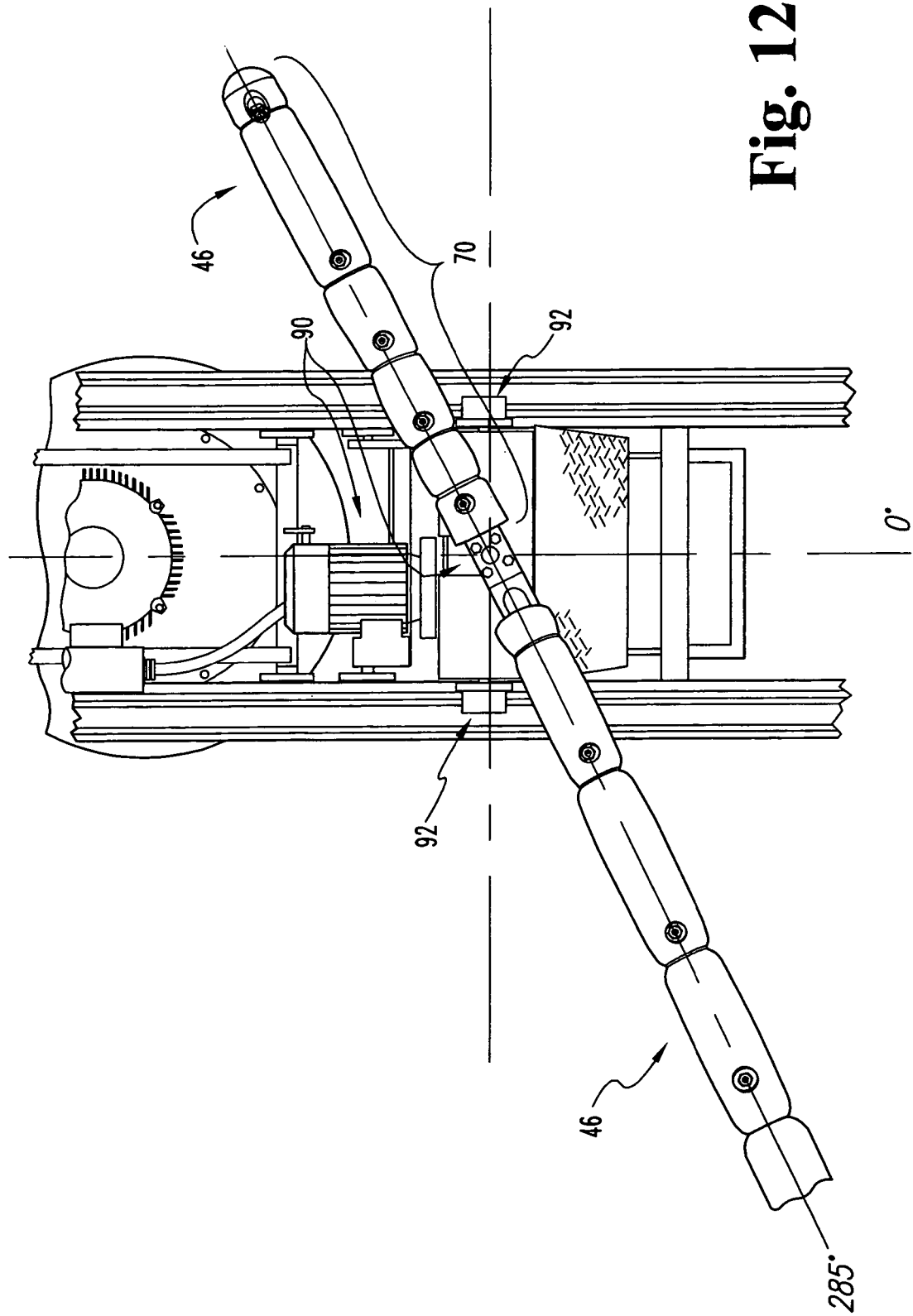
FIG. 12 is a segmented, overhead view of the overhead trolley assembly of the present invention with the offset spray arch of the present invention in a 285 degree angle of impingement to a motorcycle positioned within the wash bay.

Referring now to FIGS. 1 and 7-12, the invention utilizes an overhead trolley assembly (42) that rides on two upper parallel rails (66, 68) of the preferred superstructure to date of the automated motorcycle wash (10) of the present invention (see FIG. 7). The overhead trolley assembly (42) is driven fore and aft, from the front to the rear of a motorcycle (24) position within the wash bay (28), via a motor (80), gearbox (82) and belts (84) (see FIG. 8). The gearbox (82) and motor (80) assembly are affixed to the rails (66, 68), and rotate a shaft (86) with two pulleys (88) which in turn move the belts (84) that are tethered to the overhead trolley assembly (42). This provides the fore and aft motion up and down the sides of a motorcycle (24) positioned within wash bay (28). The overhead trolley assembly (42) utilizes a two-motor drive system to wash the four sides of a motorcycle (24) positioned within wash bay (28), with one motor (80) controlling the fore and aft motion, and the other motor, an index motor (90), controlling the one side-to-another motion of the offset spray arch (46).

The one side-to-another motion is accomplished by using an offset spray arch (46) with an offset (70) equal to roughly one-half the size of the width of a motorcycle (24) positioned within wash bay (28). When the overhead trolley assembly (42) is driven up one side of a motorcycle (24) positioned within wash bay (28), and reaches the front of the motorcycle (24), a spray arch index motor/gearbox (90), located on the overhead trolley assembly (42) directly above a motorcycle (24) positioned within wash bay (28), engage and rotate the offset spray arch (46) around the front and around the rear of the motorcycle (24), stopping the offset spray arch (46) in each case on the opposite side of the motorcycle (24), with a continuous motion so that the offset spray arch (46) is moved to the other side of the motorcycle (24), thereby reversing the overhead trolley assembly (42).

The offset spray arch (46) has a break-away system and an impact switch that will effectively shut down the entire automated motorcycle wash (10) if the offset spray arch (46) ever comes into contact with anything while washing a motorcycle (24) positioned within the wash bay (28).

F. The Varied Angle Impingements

Referring now to FIGS. 9-12, the positioning and angle of incidence of the offset spray arch (46) in relation to a motorcycle (24) positioned within wash bay (28) is fully adjustable via an encoder wheel (92) affixed to the offset spray arch (46). This allows for the direction of cleaning solutions, the high pressure rinse water, the waxes and the spot-free water to be aimed at a motorcycle (24) at different angles at different times during the automatic wash sequence. This variability allows the washes and rinses to be adjusted to the different contours of a motorcycle (24) much more effectively. The angles of incidence of the offset spray arch (46) that have run most efficiently to date have been at approximately 75, 105, 255 & 285 degrees, as illustrated in FIGS. 9-12.

G. The Programmable Logic Controller Input/Output Functions

All controls for the automated motorcycle wash (10) of the present invention to date have been processed thru a Programmable Logic Controller (PLC) via several blocks of expandable input and output modules. The input modules are hard wired to all proximity switches, encoder switches, water level switches, pressure switches, start switches and photo eye amplifiers. The output modules are hard wired to all motor contactors, relays, solenoids, air valves, pneumatic cylinders, and informational signage.

The PLC takes the information it receives from the input modules and turns on the appropriate output functions to run the automated motorcycle wash (10). This includes all signage, the front wheel stop (12) docking device, the motorcycle side stand lock (30), the rear wheel and tire cleaner (32) and length measure (34) devices, all motions of the overhead trolley assembly (42), and the variable angle impingement positioning system for the offset spray arch (46).

The PLC has programmable options to adjust the speed at which the overhead trolley assembly (42) moves around a motorcycle (24), and to adjust the angle of impingement desired for a particular pass around a motorcycle (24).

The PLC has programmable options to allow for varied pump run times, the ability to switch from one solution to another solution at any time during wash cycle (flip on the fly), which eliminates the need to stop the wash to purge out the last wash product that was run.

The PLC has programmable safety features that will shut down the entire wash operation if the wash machinery contacts a motorcycle (24) in a manner other than as intended. It will shut down the wheel conveyor systems if the side stand lock (30) is not properly engaged, but will continue to wash the motorcycle (24) without turning its wheels (40,44).

The PLC has programmable timing to adjust the controls for the dual frequency drive system that drives the overhead trolley assembly (42) and the variable angle impingement system.

The PLC has programmable options to light various signs, warning buzzers, and voice prompts.

The PLC also has a touch screen interface with diagnostics viewing, and the ability to force any of the outputs to an "on" or "off" state, as well as to view input status.

H. Dual Frequency Drive Trolley Assembly

The automated motorcycle wash (10) of the present invention to date utilizes variable frequency speed controllers, one for the overhead trolley assembly (42) and one for the offset spray arch rotating index motor/gear box (90).

Variable frequency speed controllers give the automated motorcycle wash (10) of the present invention the ability to slowly apply power to a motor then slowly take it away, giving motion with a smooth start up and a smooth controlled deceleration to a stop.

Utilizing one speed controller for each of two motors gives the automated motorcycle wash (10) the ability to overlap the two motors' run times, giving one smooth fluid cornering motion as opposed to start and stop jerking motions.

This motion also aids in the washing process of motorcycle rear saddle bags and various fender skirts, as well as being the smooth transition to the variable angle arch positioning.

I. The Operator Orientation Program

An automated motorcycle wash operator orientation program is designed to train a motorcycle rider on the proper use of the automated motorcycle wash system of the present invention, to include the proper way to protect a motorcycle's radio, GPS, open air breather, etc.

The motorcycle rider would go thru an orientation on the wash cycle at the automated motorcycle wash of the present invention by the wash proprietor, or at a motorcycle dealership, repair shop, etc., that has been pre-authorized as a training location. Once orientation has been completed, the rider would be issued a personalized code that they would have to enter at the automated motorcycle wash entry point before they would be allowed to select their payment option. An RFID tag could also be attached to a motorcycle (24), so that when a rider pulls up to the automated motorcycle wash entry point, it would automatically read the RFID tag and identify the rider as a pre-authorized user of the automated motorcycle wash and then automatically select payment.

We claim:

1. An automated motorcycle wash, comprising
a wash bay sized to position a motorcycle therein,
an overhead trolley assembly within the wash bay that is automatically moveable fore and aft over the full length of a motorcycle positioned within the wash bay, and having an offset spray arch for automatically applying cleaning and rinse solutions to the front, rear and sides of a motorcycle positioned within the wash bay, and a drying blower for automatically drying a wet motorcycle positioned within the wash bay,
a wash bay floor, housing a motorcycle front wheel stop that automatically rises from the wash bay floor when an automated motorcycle wash sequence begins, having upper and lower V-wedge rollers to receive the front wheel of a motorcycle being positioned within the wash bay; and housing roller clamps that automatically rise from the wash bay floor and firmly grip between them the front wheel tire of a motorcycle being positioned within the wash bay after the front wheel tire first contacts the front wheel stop; and a rear V-wedge roller that automatically rises from the wash bay floor behind the front wheel tire of a motorcycle being positioned within the wash bay and that makes contact with the front wheel after the front wheel first contacts the front wheel stop; and housing a side stand lock that automatically rises from the wash bay floor and makes locking contact with the extended side stand of a motorcycle being positioned within the wash bay; and housing rear wheel and tire cleaning and measuring units that automatically rise from the wash bay floor and position themselves on either side of the rear wheel of a motorcycle being positioned within the wash bay; and housing motorized conveyors under the front and rear wheels of a motorcycle positioned within the wash bay that automatically rotate the front and rear wheels of a motorcycle positioned within the wash bay when an automated motorcycle wash sequence begins.

2. The automated motorcycle wash of claim 1, wherein the fore and aft movement of the overhead trolley assembly is along two overhead parallel rails of the wash bay with the fore and aft movement powered by a first motor, and wherein the offset spray arch is moveable around the front and rear and from side-to-side of a motorcycle positioned within the wash bay by a second index motor that rotates the offset spray arch.

3. The automated motorcycle wash of claim 2, wherein the angles of incidence of the offset spray arch to a motorcycle positioned within the wash bay is angularly adjustable by an encoder wheel affixed to the offset spray arch.

4. The automated motorcycle wash of claim 3, wherein the angles of incidence of the offset spray arch to the center line of a motorcycle positioned within the wash bay are selected from the group consisting of 75, 105, 255 and 285 degrees.

5. The automated motorcycle wash of claim 1, wherein the upper and lower V-wedge rollers of the front wheel stop engage the front wheel tire of a motorcycle positioned within the wash bay above and below the center axis of the front wheel.

6. The automated motorcycle wash of claim 5, wherein the upper V-wedge rollers turn on hollow shafts through which high pressure liquids pass to V-wedge jet nozzles proximate to the front wheel and tire of a motorcycle positioned within the wash bay.

7. The automated motorcycle wash of claim 1 and further comprising a pressure sensitive plate beneath the motorized conveyor under the front wheel of a motorcycle positioned within the wash bay that triggers the rise of the roller clamps and the rear V-wedge roller.

8. The automated motorcycle wash of claim 7, wherein when the motorized conveyor under the front wheel of a motorcycle positioned within the wash bay begins to run when the rear V-wedge roller is released from engagement with the front wheel tire of a motorcycle positioned within the wash bay and the front wheel is spun counterclockwise by the motorized conveyor.

9. The automated motorcycle wash of claim 1, wherein the side stand lock is a block having a multitude of stainless steel pins spring loaded therein and protruding evenly therefrom, whereby when pins make contact with the side stand of a motorcycle positioned within the wash bay the pins in direct contact with the side stand depress into the block and the surrounding pins not depressed into the block form around the side stand to firmly hold and stabilize the side stand of a motorcycle positioned within the wash bay.

10. The automated motorcycle wash of claim 9, wherein the block is a plastic block that is approximately 5 inches tall and 20 inches wide.

11. The automated motorcycle wash of claim 1, wherein the measuring units include infrared thru beam photo eyes on either side of the rear wheel of a motorcycle being positioned within the wash bay, the thru beam moving forward from behind the rear wheel after the front wheel tire first contacts the front wheel stop, and stopping its forward motion when the thru beam is interrupted by the rear wheel tire, thereby determining the overall length of a motorcycle being positioned within the wash bay as to the distance from the front wheel stop to the position of the photo eyes when their forward motion was stopped by interruption of the thru beam, thereby positioning the rear wheel and tire cleaning units proximate to the center of the rear wheel.

12. The automated motorcycle wash of claim 11, wherein the rear wheel and tire cleaning units include jet nozzles through which flow wheel cleaning liquids located at the ends thereof proximate to the rear wheel of a motorcycle being positioned within the wash bay.

13. A motorcycle front wheel stop docking device for an automated motorcycle wash, comprising
a wash bay sized to position a motorcycle therein,
a wash bay floor, having a motorcycle front wheel stop that automatically rises from the wash bay floor when an automated motorcycle wash sequence begins, with upper and lower V-wedge rollers to receive the front wheel tire of a motorcycle being positioned within the wash bay; and having roller clamps that automatically rise from the wash bay floor and firmly grip between them the front wheel tire of a motorcycle being positioned within the wash bay after the front wheel tire first contacts the front wheel stop; and having a rear V-wedge roller that automatically rises from the wash bay floor behind the front wheel of a motorcycle being positioned within the wash bay and makes contact with the front wheel tire after the front wheel tire first contacts the front wheel stop.

14. The motorcycle front wheel docking device of claim 13, wherein the upper and lower V-wedge rollers of the front wheel stop engage the front wheel tire of a motorcycle positioned within the wash bay above and below the center axis of the front wheel.

15. The automated motorcycle wash of claim 14, wherein the upper V-wedge rollers turn on hollow shafts through which high pressure liquids pass to V-wedge jet nozzles proximate to the front wheel of a motorcycle positioned within the wash bay.

16. A motorcycle side stand lock for an automated motorcycle wash, comprising
a wash bay sized to position a motorcycle therein,
a wash bay floor, having a side stand lock that automatically rises from the wash bay floor and makes locking contact with the an extended side stand of a motorcycle being positioned within the wash bay.

17. The motorcycle side stand lock of claim 16, wherein the side stand lock is a block having a multitude of stainless steel pins spring loaded therein and protruding evenly therefrom, whereby when pins make contact with the side stand of a motorcycle positioned within the wash bay the pins in direct contact with the side stand depress into the block and the surrounding pins not depressed into the block form around the side stand to firmly hold and stabilize the side stand of a motorcycle positioned within the wash bay.

18. The automated motorcycle wash of claim 17, wherein the block is a plastic block that is approximately 5 inches tall and 20 inches wide.

19. A motorcycle rear tire and wheel cleaner and length measurer for an automated motorcycle wash, comprising
a wash bay sized to position a motorcycle therein, having a motorcycle front wheel stop, and
a wash bay floor, having rear tire and wheel cleaning and measuring units that automatically rise from the wash bay floor and position themselves on either side of the rear wheel of a motorcycle being positioned within the wash bay, wherein the measuring units include infrared thru beam photo eyes on either side of the rear wheel of a motorcycle being positioned within the wash bay, the thru beam moving forward from behind the rear tire and wheel after the front tire of the motorcycle first contacts the front tire stop to position themselves, and stopping their forward motion when the thru beam is interrupted by the rear tire, thereby positioning themselves and thereby determining the overall length of a motorcycle being positioned within the wash bay as being the distance from the front wheel stop to the position of the photo eyes when their forward motion was stopped by interruption of the thru beam, which thereby positions the rear tire and wheel cleaning units proximate the center of the rear wheel.

20. The automated motorcycle wash of claim 19, wherein the rear tire and wheel cleaning units include spray nozzles through which flow wheel cleaning liquids located at the ends thereof proximate the rear wheel and tire of a motorcycle being positioned within the wash bay.

21. An overhead trolley assembly for an automated motorcycle wash, comprising a wash bay sized to position a motorcycle therein, an overhead trolley assembly within the wash bay that is automatically moveable fore and aft over the full length of a motorcycle positioned within the wash bay, and having an offset spray arch with an offset equal to about one-half the width of a motorcycle positioned within the wash bay for automatically applying cleaning and rinse solutions to the front, rear and sides of a motorcycle positioned within the wash bay, and wherein the positioning of the offset spray arch and the angles of incidence of the cleaning and rinse solutions aimed by the offset spray arch at the sides of a motorcycle positioned within the wash bay are angularly adjusted through different angles of incidence by an encoder wheel affixed to the offset spray arch during the fore and aft movements of the overhead trolley assembly over the full length of a motorcycle positioned within the wash bay.

22. The automated motorcycle wash of claim 21 wherein the positioning and angles of incidence of the cleaning and rinse solutions directed by the offset spray arch are selected from the group consisting of 75, 105, 255 and 285 degrees with reference to the center line of a motorcycle positioned within the wash bay.

* * * * *